United States Patent Office 3,420,804
Patented Jan. 7, 1969

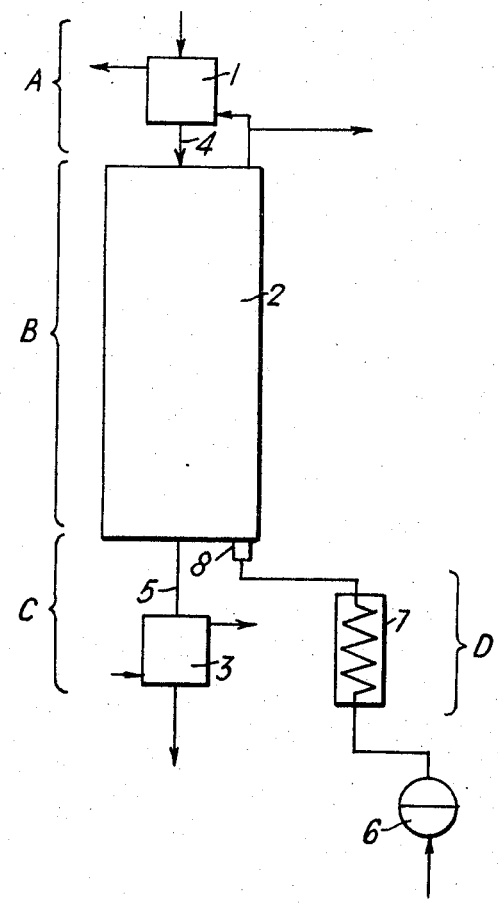

3,420,804
PROCESS FOR INCREASING THE MOLECULAR WEIGHT OF A POLYAMIDE IN THE SOLID STATE
Keith W. Ramsey, Goitre, Pontypool, Monmouthshire, and John H. Dunnill, Longlevens, Gloucestershire, England, assignors to British Nylon Spinners Limited, Pontypool, England
Filed June 1, 1965, Ser. No. 460,282
Claims priority, application England, June 3, 1964, 22,888/64
U.S. Cl. 260—78                        7 Claims
Int. Cl. C08g 20/20

ABSTRACT OF THE DISCLOSURE

A process for increasing the molecular weight of a polyamide which comprises heating the solid polyamide in particulate form, at a temperature above 150° C. but below its melting point, with superheated steam, which also serves to dry the polyamide. Preferably the polyamide, the molecular weight of which is increased by the process, has an initial relative viscosity of between 20 and 50 and the process increases this viscosity by at least 10. The process provides high relative viscosity polyamides which are capable of being melt-spun into filaments.

---

This invention relates to a process for increasing the molecular weight of polyamides in solid form derived from dibasic acids and diamines, to the solid polyamides of increased molecular weight so produced, and to apparatus for carrying into effect the process of the invention.

Polyamide yarn is commonly produced by spinning a molten mass of the polymer; a process which is generally referred to as melt-spinning. United States Patent specification No. 2,571,975 in the name of Joseph Elmer Waltz as assignor to E.I. du Pont de Nemours & Company describes a process of melt-spinning polyamides wherein the molten polymer prior to spinning is maintained under steam at a predetermined positive pressure. The steam serves to blanket the molten polymer and to adjust the viscosity of the melt in relation to the water vapour pressure of the steam. Utilisation of a steam blanket in the manner described in this specification provides a polyamide yarn of substantially uniform molecular weight.

We have now found that it is possible to increase the molecular weight of a polyamide derived from a dibasic acid and a diamine by contacting the polyamide at a temperature below its melting point, that is to say in the solid phase, with superheated steam.

Throughout the present specification and the claiming clauses thereof the molecular weight of a given polyamide will be referred to in terms of relative viscosity, this viscosity being defined as the ratio of the viscosity of a solution of the polyamide in ninety percent by weight formic acid containing 10.98 grams of polyamide per 100 cc. of solution at 25° C. to the viscosity of 90 percent by weight formic acid at the same temperature.

We are aware that, in the melt-spinning apparatus described in the aforementioned United States Patent specification, steam is shown as moving up a column countercurrent to a descending stream of polyhexamethylene adipamide flakes, but, since the flakes are free-falling, the period of contact between flake and steam is so brief as to preclude any significant increase in the molecular weight of the polyhexamethylene adipamide.

The intimate relationship that exists between molecular weight and the relative viscosity of polyamides is well known and has been described in detail by Mark in "Physical Chemistry of High Polymeric Systems," volume II, Inter Sciences Publications Inc. 1940.

Thus, according to one aspect of the present invention there is provided a process for increasing the molecular weight of a polyamide which comprises heating the solid polyamide in particulate form, at a temperature above 150° C. but below its melting point, with superheated steam, which also serves to dry the polyamide.

According to a further aspect of the present invention the polyamide, the molecular weight of which is increased by the process of this invention, has an initial relative viscosity of between 20 and 50 and the process increases this viscosity by at least 10.

The process of this invention provides high relative viscosity polyamides which are capable of being melt-spun into filaments. High relative viscosity polyamides ($\geqslant 50$) heretofore available have not been melt-spinnable into filaments of high quality, a deficiency which has been attributed to the highly branched nature of those polyamides. The high relative viscosity polyamides of this invention are linear or substantially so and, the absence of any substantial branching is reflected in the linear nature of the relationship between the relative viscosity and the total end group content (abbreviated as T.E.G.) expressed as $$\log_{10} \text{R.V.} = 5.656 - 1.935 \log_{10} \text{T.E.G.}$$

The polyamides of this invention obey this relationship with a maximum deviation of ±5. Thus, a polyhexamethylene adipamide polymer prepared by the process of this invention with an R.V. of 72 would, using the relationship expressed above, be expected to have a total end group content of 92 micro equivalent/gm. The experimental value found for the T.E.G. content was 91 micro equivalents/gm. Filaments, melt-spun from the linear polyamides of high relative viscosity, are characterised by a good tenacity.

The superheated steam may contain in admixture therewith a gas, such, for example, as nitrogen or carbon dioxide which does not react with the polyamide.

While it is generally convenient to use dry steam at atmospheric pressure, steam at a higher pressure may be used. The steam pressure may be as high as 30 pounds per square inch gauge but generally, if pressures higher than atmospheric are used, it is preferred that it be within the limits of 0.5 to 10 pounds per square inch gauge. Utilisation of steam at a pressure below atmospheric is also possible. One drawback of using the high pressures mentioned above or reduced pressures is that the process must then be conducted in a pressure resisting system.

The degree of superheating of the steam can vary within wide limits but is dependent, to some extent at least, on the melting-point of the polyamide being heated.

Inasmuch as polyamides from hexamethylene diamine and adipic acid melt at a temperature around 270° C., we find it convenient to use, in the process for increasing the molecular weight of those polymers, dry steam at atmospheric pressure having a temperature in the range of from 150° C. to 250° C., preferably from 180° C. to 240° C.

The process of the present invention may be carried into effect in a number of ways. For example, the process may be carried out by passing superheated steam through a mass of the polyamide, in the solid state and in finely divided form (for example, in chip form), disposed in a suitable vessel; or, again, the polyamide, in a finely divided state, may be passed through a column co-current with, or counter current to, the superheated steam.

The invention also comprises apparatus for increasing the molecular weight of a polyamide derived from a dibasic acid and a diamine comprising means for delivering the polyamide in solid particulate form to a contacting chamber in which the polyamide is heated by superheated steam delivered to said chamber through a control valve wherein the relative viscosity, as herein defined, of the polyamide is increased by at least 2.

Conveniently, the apparatus is designed to operate on a through-flow basis and includes means for forwarding the polyamide through the contacting chamber co-current with or counter-current to the superheated steam and means for removing the solid polyamide of increased molecular weight fro mthe contacting chamber.

One convenient form of apparatus for carrying out the process of the present invention will now be described with reference to the accompanying drawing in which FIGURE 1 represents a general view of the apparatus.

Referring to FIGURE 1, the apparatus shown comprises, essentially, four interconnected sections, namely a feed section A, a contacting section B, a storage section C, and a steam generating section D. The three sections A, B and C comprise a hopper 1, a vertical metal contact column 2 and a storage vessel 3, and means 4 for forwarding the polyamide in solid particulate form from the hopper 1 to the contact column 2 and means 5 for forwarding the polyamide of increased molecular weight from the base of the column to the storage vessel 3. The steam generating section D comprises a boiler 6 and a superheater 7.

In operation the polyamide in chip form is fed from the hopper 1 into the contact column 2, down which it passes countercurrent to an ascending stream of superheated steam, which enters the contact column from the superheater 7 through a control valve 8. In consequence of its contact with superheated steam at a suitable temperature, the polyamide on arrival at the base of the column 2 possesses a higher molecular weight than it did on entering it. From the bottom of the column, the polyamide of increased molecular weight is forwarded to the storage vessel 3, by forwarding means 5.

The following table, which is given for the purpose of illustrating the present invention, shows the effect of heating one and a quarter pounds of polyhexamethylene adipamide polymer in chip form (relative viscosity 48.5 and a moisture content of 0.60) with dry superheated steam at atmospheric pressure at various temperatures below the melting point (270° C.) of the polyhexamethylene adipamide and for varying lengths of time.

| Temperature 0° C | Time of Heating in Minutes | Relative Viscosity | Moisture Content |
|---|---|---|---|
| 180 | 60 | 47.7 | |
|  | 1,020 | 79.6 | |
| 200 | 90 | 57.6 | 0.07 |
| 220 | 45 | 51.2 | 0.15 |
|  | 90 | 67.1 | 0.12 |
|  | 120 | 75.5 | 0.14 |
| 230 | 45 | 52.4 | 0.27 |
|  | 90 | 64.4 | 0.10 |
|  | 120 | 82.2 | 0.07 |
| 240 | 45 | 58.6 | 0.05 |
|  | 90 | 85.5 | 0.04 |
|  | 120 | 106.7 | 0.05 |
| 250 | 40 | 59.0 | 0.08 |
|  | 90 | 101.3 | 0.13 |

The heating times listed in the above table include a 15 minute period which was time required for the polyhexamethylene adipamide chips to attain the temperature of the superheated steam.

Examination of the changes in amine and carboxyl end group concentration in the polyhexamethylene adipamide subjected to the action of the superheated steam showed that the concentration of free amine end groups had not increased with respect to the carboxyl end group concentration which confirmed that the solid state polymerisation with simultaneous drying of polyhexamethylene adipamide using superheated steam at a temperature in the range 150° C.–250° C. was accomplished without any substantial thermal degradation of the polyamide which was linear or substantially so. The high relative viscosity polyamides so produced were found to obey the relationship discussed before in column 2 and were melt-spinnable into fibres by conventional melt-spinning processes.

What we claim is:

1. A process for increasing the molecular weight of a solid polyamide of a dicarboxylic acid and a diamine which polyamide has an initial viscosity of between 20 and 50, defined as the ratio of the viscosity of a solution of the polyamide in 90 percent by weight formic acid containing 10.98 grams of polyamide per 100 cc. of solution at 25° C. to the viscosity of 90 percent by weight formic acid at the same temperature, wherein the said initial viscosity is increased by at least 10 while the degree of branching remains very low as shown by a substantially linear relationship between the relative viscosity and the total end group content, said process comprising heating the solid polyamide in particulate form, at a temperature above about 150° C. but below its melting point, with superheated steam, which also serves to dry the polyamide.

2. A process as claimed in claim 1 wherein the solid polyamide is heated with dry steam at atmospheric pressure.

3. A process as claimed in claim 1 wherein the solid polyamide is heated with dry steam which is at a steam pressure of up to 30 pounds per square inch gauge.

4. A process as claimed in claim 3 wherein the dry steam is at pressure of between 0.5 and 10 pounds per square inch gauge.

5. A process as claimed in claim 1 wherein the polyamide is polyhexamethylene adipamide and it is heated with dry steam at atmospheric pressure having a temperature in the range of from 150° C. to 250° C.

6. A process according to claim 5 wherein said steam temperature is about 180° C. to 240° C.

7. A process for increasing the molecular weight of solid polyhexamethylene adipamide having an initial relative viscosity of between 20 and 50 defined as the ratio of the viscosity of a solution of said polyhexamethylene adipamide and 90 percent by weight formic acid containing 10.98 grams of said polyhexamethylene adipamide per 100 cc. of solution at 25° C. to the viscosity of 90 percent by weight formic acid at the same temperature, wherein the said initial viscosity is increased by at least 10 while the degree of branching remains very low as shown by a substantially linear relationship between the relative viscosity and the total end group content, said process comprising heating the solid polyamide in particulate form, at a temperature above 150° C. but below its melting point, with superheated dry steam having a pressure up to about 30 atmospheres and a temperature from 180° C. to 240° C.

References Cited

UNITED STATES PATENTS 2,993,879  7/1961  Gabler et al. _____ 260—78
3,155,637  11/1964  Reichold et al. _____ 260—78

FOREIGN PATENTS 802,970  10/1958  Great Britain.
806,088  12/1958  Great Britain.

WILLIAM H. SHORT, Primary Examiner.

F. D. ANDERSON, Assistant Examiner.

U.S. Cl. X.R.

260—96